United States Patent
Xu et al.

(10) Patent No.: US 9,771,792 B2
(45) Date of Patent: Sep. 26, 2017

(54) METHOD AND APPARATUS FOR MULTI-CHANNEL DOWNHOLE ELECTROMAGNETIC TELEMETRY

(71) Applicant: Evolution Engineering Inc., Calgary (CA)

(72) Inventors: Mingdong Xu, Calgary (CA); Jili Liu, Calgary (CA); David A. Switzer, Calgary (CA); Aaron W. Logan, Calgary (CA)

(73) Assignee: Evolution Engineering Inc., Calgary (CA)

( * ) Notice: Subject to any disclaimer, the term of this patent is extended or adjusted under 35 U.S.C. 154(b) by 0 days.

(21) Appl. No.: 14/648,822

(22) PCT Filed: Dec. 6, 2013

(86) PCT No.: PCT/CA2013/050943
§ 371 (c)(1),
(2) Date: Jun. 1, 2015

(87) PCT Pub. No.: WO2014/085936
PCT Pub. Date: Jun. 12, 2014

(65) Prior Publication Data
US 2015/0315905 A1    Nov. 5, 2015

Related U.S. Application Data

(60) Provisional application No. 61/734,772, filed on Dec. 7, 2012.

(51) Int. Cl.
*G01V 3/00* (2006.01)
*E21B 47/12* (2012.01)
(Continued)

(52) U.S. Cl.
CPC ........... *E21B 47/122* (2013.01); *H04B 13/02* (2013.01); *H04L 27/2601* (2013.01);
(Continued)

(58) Field of Classification Search
None
See application file for complete search history.

(56) References Cited

U.S. PATENT DOCUMENTS

| 4,302,757 A | 11/1981 | Still |
| 4,641,318 A * | 2/1987 | Addeo .................. H04B 7/005 375/260 |

(Continued)

FOREIGN PATENT DOCUMENTS

| CA | 2 476 370 A1 | 1/2005 |
| WO | 2004/005966 A1 | 1/2004 |
| WO | 2006/023012 A2 | 3/2006 |

OTHER PUBLICATIONS

Xia et al., "Attenuation Predictions at Extremely Low Frequencies for Measurement-While-Drilling Electromagnetic Telemetry System," IEEE Transactions on Geoscience and Remote Sensing, vol. 31, Issue 6, Nov. 1993, pp. 1222-1228.

(Continued)

*Primary Examiner* — Brian Zimmerman
*Assistant Examiner* — Thomas McCormack
(74) *Attorney, Agent, or Firm* — Seed IP Law Group LLP

(57) ABSTRACT

An electromagnetic (EM) telemetry method comprises encoding downhole data into a single data stream; separating the single data stream into a plurality of separate data streams; converting each separate data stream into a corresponding separate waveform using a selected digital modulation technique wherein at least one of the frequency and phase of each waveform is assigned a unique value or unique non-overlapping range of values; combining each separate (Continued)

waveform into a combined waveform; and transmitting from a downhole location, an electromagnetic (EM) telemetry carrier wave comprising the combined waveform.

21 Claims, 19 Drawing Sheets

(51) Int. Cl.
*H04L 27/28* (2006.01)
*H04B 13/02* (2006.01)
*H04L 27/26* (2006.01)
*H04L 27/02* (2006.01)
*H04L 27/10* (2006.01)
*H04L 27/18* (2006.01)

(52) U.S. Cl.
CPC .............. *H04L 27/28* (2013.01); *H04L 27/02* (2013.01); *H04L 27/10* (2013.01); *H04L 27/18* (2013.01)

(56) References Cited

U.S. PATENT DOCUMENTS

| | | | |
|---|---|---|---|
| 4,642,800 A * | 2/1987 | Umeda | E21B 47/18 367/83 |
| 6,023,658 A * | 2/2000 | Jeffryes | E21B 47/18 702/16 |
| 6,687,306 B1 * | 2/2004 | Wang | H04B 14/04 375/242 |
| 7,587,936 B2 * | 9/2009 | Han | E21B 47/082 367/25 |
| 8,251,160 B2 | 8/2012 | Gopalan et al. | |
| 2004/0156264 A1 | 8/2004 | Gardner et al. | |
| 2005/0226340 A1 | 10/2005 | Ahmed | |
| 2006/0227005 A1 * | 10/2006 | Fincher | E21B 47/12 340/855.4 |
| 2006/0286931 A1 * | 12/2006 | Rhodes | H04B 13/02 455/40 |
| 2007/0247328 A1 * | 10/2007 | Petrovic | G01V 11/002 340/853.7 |
| 2007/0263488 A1 * | 11/2007 | Clark | E21B 47/12 367/87 |
| 2009/0268034 A1 * | 10/2009 | Nowotarski | H04N 17/004 348/181 |
| 2010/0039286 A1 * | 2/2010 | Robbins | G01V 11/002 340/855.3 |
| 2013/0137387 A1 * | 5/2013 | Christensen | H03J 5/00 455/101 |

OTHER PUBLICATIONS

Huawei Technologies Co. Ltd., "Mitigation of inter-cell interference between pilot patterns for channel estimation," 3GPP TSG RAN WGI #42, London, UK, Aug. 29-Sep. 2, 2005, 6 pages.

* cited by examiner

METHOD AND APPARATUS FOR MULTI-CHANNEL DOWNHOLE ELECTROMAGNETIC TELEMETRY

FIELD

This invention relates generally to downhole measurement-while-drilling (MWD) using electromagnetic (EM) telemetry, and in particular to a method and apparatus for transmitting and receiving multi-channel downhole EM telemetry.

BACKGROUND

The recovery of hydrocarbons from subterranean zones relies on the process of drilling wellbores. The process includes drilling equipment situated at surface and a drill string extending from the surface equipment to the formation or subterranean zone of interest. The drill string can extend thousands of feet or meters below the surface. The terminal end of the drill string includes a drill bit for drilling (or extending) the wellbore. In addition to the conventional drilling equipment mentioned, the system also relies on some sort of drilling fluid system, in most cases a drilling "mud" which is pumped through the inside of the pipe, which cools and lubricates the drill bit and then exits out of the drill bit and carries the rock cuttings back to surface. The mud also helps control bottom hole pressure and prevent hydrocarbon influx from the formation into the wellbore which can potentially cause a blow out at surface.

Directional drilling is the process of steering a well away from vertical to intersect a target endpoint or follow a prescribed path. At the terminal end of the drill string is the bottom-hole-assembly (or BHA) which comprises of 1) drill bit; 2) steerable downhole mud motor of rotary steerable system; 3) sensors of survey equipment (Logging While Drilling (LWD) and/or Measurement-while-drilling (MWD)) to evaluate downhole conditions as drilling progresses; 4) equipment for telemetry of data to surface; and 5) other control process equipment such as stabilizers or heavy weight drill collars. The BHA is conveyed into the wellbore by a string of metallic tubulars (drill pipe). MWD equipment is used to provide downhole sensor and status information to surface in a near real-time mode while drilling. This information is used by the rig crew to make decisions about controlling and steering the well to optimize the drilling speed and trajectory based on numerous factors, including lease boundaries, existing wells, formation properties, hydrocarbon size and location, etc. This can include making intentional deviations from the planned wellbore path as necessary based on the information gathered from the downhole sensors during the drilling process. The ability to obtain real time data MWD allows for a relatively more economical and more efficient drilling operation.

In MWD, the currently used MWD tools contain essentially the same sensor package to survey the well bore but send the data back to surface by various telemetry methods. Such telemetry methods include but are not limited to the use of hardwired drill pipe, acoustic telemetry, fibre optic cable, Mud Pulse (MP) Telemetry and Electromagnetic (EM) Telemetry.

EM Telemetry involves the generation of electromagnetic waves which travel through the wellbore's surrounding formations, with detection of the waves at surface. The BHA metallic tubular is typically used as the dipole antenna for the EM telemetry tool by dividing the drill string into two conductive sections by an insulating joint or connector ("gap sub") typically placed within the BHA, with the bottom portion of the BHA and the drill pipe above each forming a conductor for the dipole antenna. In EM telemetry systems, a very low frequency alternating current is driven across the gap sub. The sub is electrically isolated ('nonconductive") at its center joint, effectively creating an insulating break ("gap") between the very bottom of the drill string and the larger top portion that includes all the drill pipe up to the surface. The low frequency AC voltage and magnetic reception is controlled in a timed/coded sequence to energize the earth and create a measurable voltage differential between the surface ground and the top of the drill string. The EM signal which originated across the gap is detected at surface and measured as a difference in the electric potential from the drill rig to various surface grounding rods located about the lease site.

Advantageously, an EM system can transmit data without a continuous fluid column; hence it is useful when there is no mud flowing. This is advantageous because the EM signal can transmit the directional survey data while the drill crew is adding new pipe.

However, EM transmissions can be strongly attenuated over long distances through the earth formations, with higher frequency signals attenuating faster than low frequency signals, and thus EM telemetry tends to require a relatively large amount of power so that the signals can be detected at surface.

MWD telemetry methods rely on modulation of digital signals similar to that developed in the telecommunications industry. Typically, the signal is modulated by a variety of standard modulation techniques. The three key parameters of a periodic waveform are its amplitude ("volume"), its phase ("timing") and its frequency ("pitch"). Any of these properties can be modified in accordance with a low frequency signal to obtain the modulated signal. Frequency-shift keying (FSK) is a frequency modulation scheme in which digital information is transmitted through discrete frequency changes of a carrier wave. The simplest FSK is binary FSK (BFSK). BFSK uses a pair of discrete frequencies to transmit binary (0s and 1s) information. Amplitude shift keying (ASK) conveys data by changing the amplitude of the carrier wave; Phase-shift keying (PSK) conveys data by changing, or modulating, the phase of a reference signal (the carrier wave). It is known to combine different modulation techniques. For example, combining Amplitude and Phase-shift keying is a digital modulation scheme that conveys data by changing, or modulating, both the amplitude and the phase of a reference signal (or the carrier wave). Asymmetric Phase-shift keying, (APSK), combines both Amplitude-shift keying (ASK) and Phase-shift keying (PSK) to increase the symbol-set.

The choice of modulation scheme uses a finite number of distinct signals to represent digital data. PSK uses a finite number of phases, each assigned a unique pattern of binary digits. Usually, each phase encodes an equal number of bits. Each pattern of bits forms the symbol that is represented by the particular phase. The demodulator, which is designed specifically for the symbol-set used by the modulator, determines the phase of the received signal and maps it back to the symbol it represents, thus recovering the original data. This requires the receiver to be able to compare the phase of the received signal to a reference signal.

SUMMARY

According to one aspect of the invention, there is provided an electromagnetic (EM) telemetry method comprising: encoding downhole data into a single data stream; separating the single data stream into a plurality of separate data streams; converting each separate data stream into a corresponding separate waveform using a selected digital modulation technique wherein at least one of the frequency and phase of each waveform is assigned a unique value or unique non-overlapping range of values; combining each separate waveform into a combined waveform; and transmitting from a downhole location, an electromagnetic (EM) telemetry carrier wave comprising the combined waveform. The method can further comprise: receiving the carrier wave at a surface location, amplifying the carrier wave, applying a band-pass filter to the carrier wave, and filtering each separate waveform from the carrier wave using the assigned unique value of that separate waveform; demodulating each separate waveform into the corresponding separate data stream; and combining the separate data streams into the single data stream. Thus, the single data stream can be decoded back into the downhole data and displayed.

The selected digital modulation technique can be selected from the group consisting of: amplitude shift keying (ASK), phase shift keying (PSK), and frequency shift keying (FSK). In particular, the digital modulation technique can be PSK (either BFSK or QFSK) and only the frequency of each waveform can be assigned a unique value.

The carrier wave can be an analog signal and the step of demodulating can be applied to the analog carrier wave in which case the separate data streams are analog and are converted into digital data streams. Alternatively, the carrier wave can be analog and the method can further comprise converting the analog carrier wave into a digital signal before the separate data streams are separated from the carrier wave.

According to another aspect of the invention, there is provided an electromagnetic (EM) telemetry system comprising a downhole telemetry tool that includes: a gap sub assembly; an EM carrier frequency signal generator for generating an EM carrier wave across an electrically isolated gap of the gap sub assembly; and an electronics subassembly communicative with the signal generator. The electronics subassembly comprises a downhole processor and a memory containing an encoder program code. This encoded program code is executable by the downhole processor to perform a method comprising: encoding downhole data into a single data stream; separating the single data stream into a plurality of separate data streams; converting each separate data stream into a corresponding separate waveform using a selected digital modulation technique wherein at least one of the frequency and phase of each waveform is assigned a unique value or unique non-overlapping range of values; combining each separate waveform into a combined waveform; and sending control signal to the signal generator to transmit an EM telemetry carrier wave comprising the combined waveform.

The downhole telemetry tool can further comprise a directional and inclination sensor module and a drilling conditions sensor module that are both communicative with the processor.

The system can also comprise a surface receiver configured to receive the carrier wave; and a decoder communicative with the surface receiver. The decoder comprises a surface processor and a memory containing a decoder program code executable by the surface processor to perform a method comprising: filtering each separate waveform from the carrier wave using the assigned unique value of that separate waveform; demodulating each separate waveform into the corresponding separate data stream; and combining the separate data streams into the single data stream. The decoder program can be further executable by the surface processor to decode the single data stream back into the downhole data and to transmit the downhole data to a display.

The surface receiver can further comprise an amplifier configured to amplify the received carrier wave and a band pass filter configured to filter out unwanted noise in the received carrier wave.

DETAILED DESCRIPTION

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment.

An EM signal generated by a downhole EM signal transmitter needs to have a sufficient strength that the signal is still detectable at surface by a surface EM signal receiver despite considerable attenuation of the transmitted signal as the signal travels long distances through the earth's formations.

The embodiments described herein generally relate to a multi-channel EM telemetry system which comprise a downhole EM telemetry tool that combines multiple EM waveforms each representing a separate channel of telemetry data into a combined waveform and transmits this combined waveform to surface in a single EM transmission, and which also comprises a surface receiver that receives the combined waveform and decodes the waveform into the separate channels of telemetry data. It is expected that a high overall efficiency of data transmission can be achieved by sending multiple channels of telemetry data in a single EM transmission comprising the combined waveform.

Figure 1:
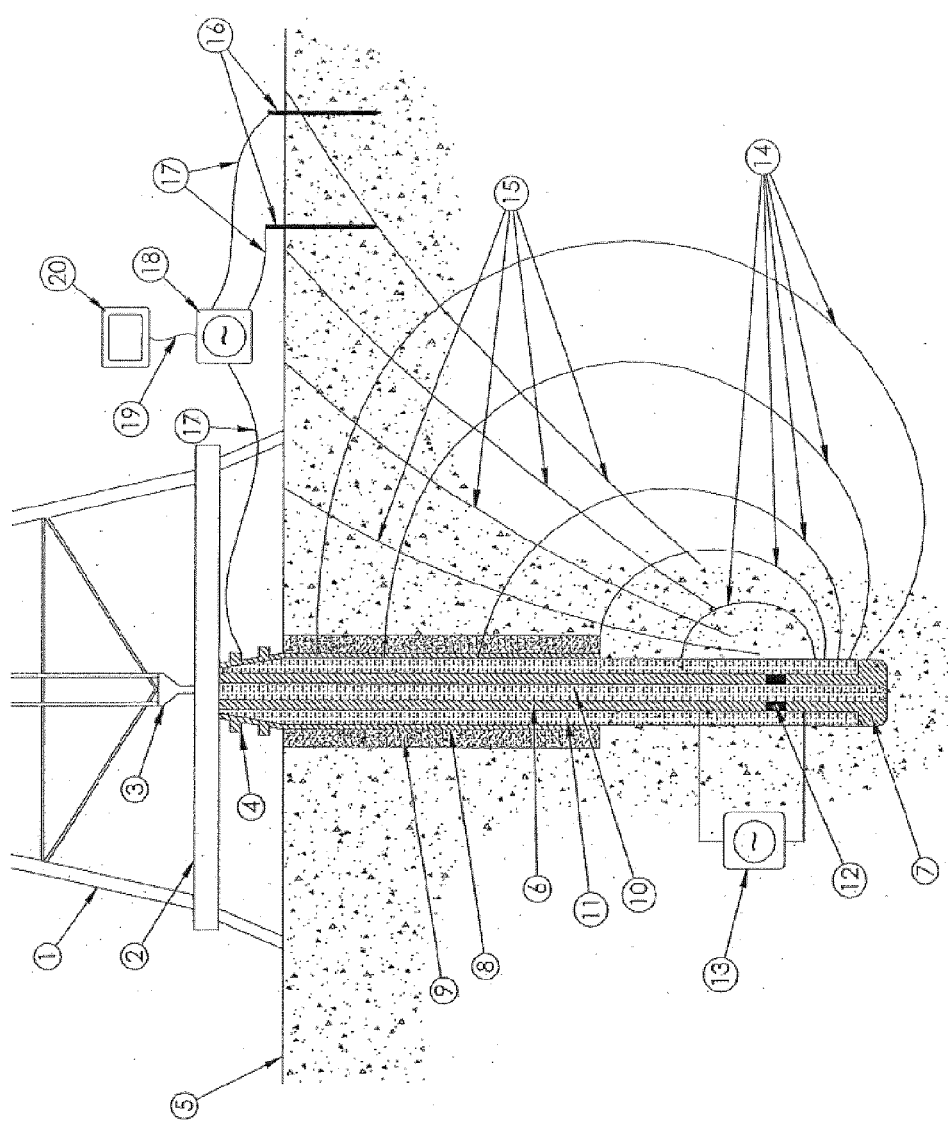
FIG. 1 is schematic side view of a multi-channel EM telemetry system in operation, according to embodiments of the invention.

Referring to FIG. 1, there is shown a schematic representation of an EM telemetry system in which various embodiments can be employed. Downhole drilling equipment including a derrick 1 with a rig floor 2 and draw works 3 facilitate rotation of drill pipe 6 into the ground 5. The drill pipe 6 is enclosed in casing 8 which is fixed in position by casing cement 9. Bore drilling fluid 10 is pumped down drill pipe 6 and through an electrically isolating gap sub assembly 12 to drill bit 7. Annular drilling fluid 11 is then pumped back to the surface and passes through a blow out preventer (BOP) 4 positioned above the ground surface. The gap sub assembly 12 may be positioned at the top of the BHA, with the BHA and the drill pipe 6 each forming a conductor of the dipole antenna. The gap sub assembly 12 is electrically isolated (nonconductive) at its center joint effectively creating an insulating break, known as a gap, between the bottom of the drill string with the BHA and the larger top portion of the drill string that includes the rest of the drill pipe 6 up to the surface. A very low frequency alternating electrical current 14 is generated by an EM carrier frequency signal transmitter 13 and driven across the gap sub assembly 12. The low frequency AC voltage and magnetic reception is controlled in a timed/coded sequence to energize the earth and create an electrical field 15. Communication cables 17 transmit the measurable voltage differential from the top of the drill string and various surface grounding rods 16 located about the drill site to a signal receiver box 18 which receives and processes the EM telemetry transmission. The grounding rods 16 are generally randomly located on site with some attention to site operations and safety. A receiver box communication cable 19 transmits the data received to a computer display 20 after decoding, thereby providing measurement while drilling information to the rig operator.

Figure 2:
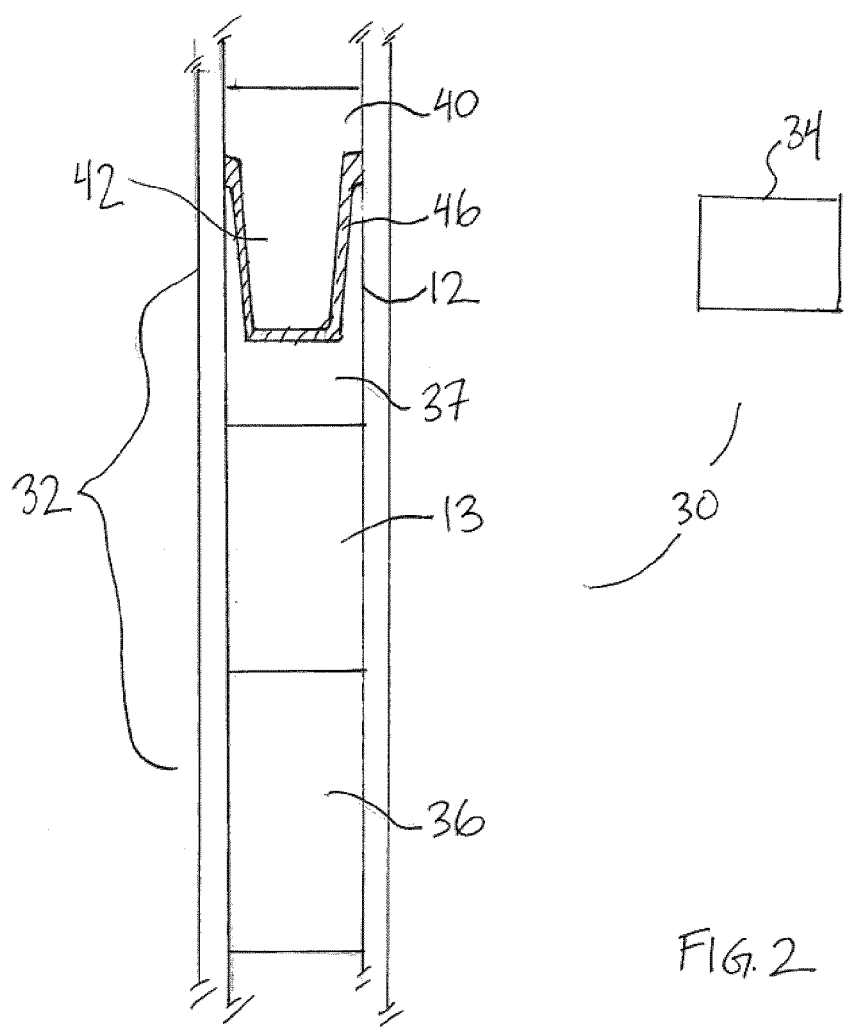
FIG. 2 is a schematic block diagram of components of a downhole EM telemetry tool of the EM telemetry system according to one embodiment.

Referring now to FIG. 2, an EM telemetry system 30 according to one embodiment comprises a multi-channel downhole EM telemetry tool 32 and surface receiving and processing equipment 34. The EM telemetry tool 32 generally comprises the gap sub assembly 12, the EM carrier frequency signal transmitter 13, and an electronics subassembly 36. The electronics subassembly 36 houses sensors for taking downhole measurements as well as a processor and memory which contains program code executable by the processor to encode the sensor measurements into multiple channels of telemetry data each with a separate EM waveform, combine the separate EM waveforms into a combined waveform, and send control signals to the EM carrier frequency transmitter 13 to transmit the combined waveform to surface. The surface receiving and processing equipment 34 can be housed in the receiver box 18 and comprise equipment to receive the combined waveform, filter and process the waveform, and decode the waveform into the telemetry data.

The gap sub assembly 12 comprises an electrically conductive female member 37 comprising a female mating section and an electrically conductive male member 40 comprising a male mating section. The male mating section 42 is matingly received within the female mating section and electrically isolated therefrom by an electrical isolator 46. The electrical isolator 46 comprises electrical insulating material that is positioned in between the male and female mating sections. The electrical isolator 46 thereby electrically isolates the male member 40 from the female member 37 and the male member 40, female member 37 and electrical isolator 46 together function as the gap sub assembly 12 for EM telemetry.

Figure 3:
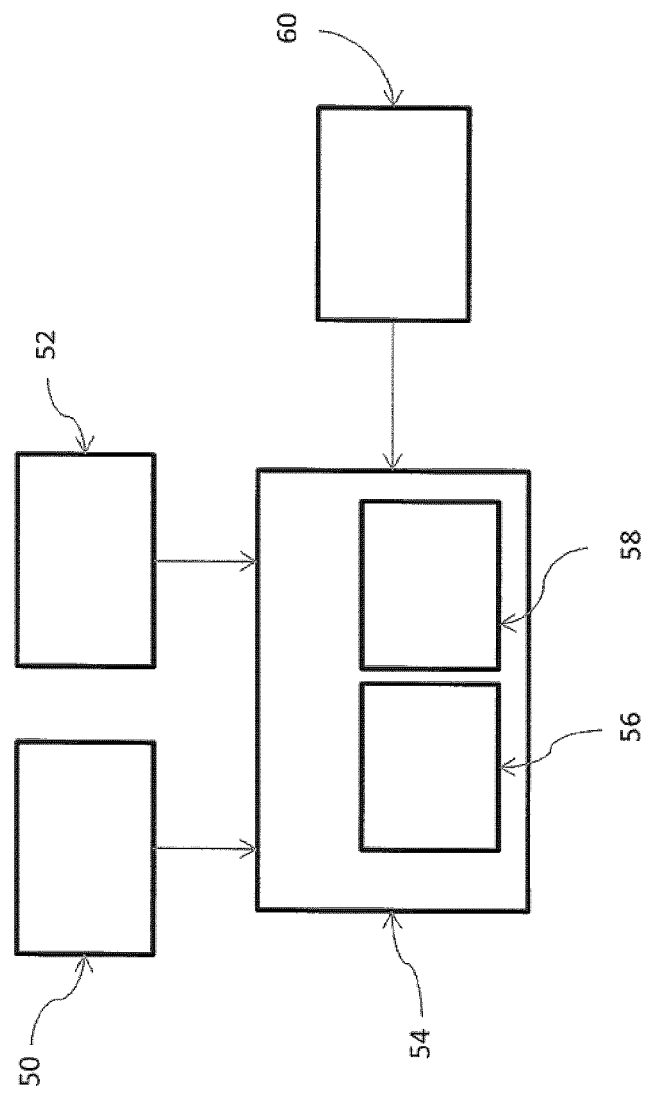
FIG. 3 is a schematic block diagram of components an electronics subassembly of the downhole EM telemetry tool.

Referring to FIG. 3, the electronics subassembly 36 comprises a tubular housing (not shown) and the following components housed inside the housing: a directional and inclination (D&I) sensor module 50; drilling conditions sensor module 52; a main circuit board 54 containing a master processing unit (MPU or otherwise referred to as the "downhole processor") 56, a memory 58 having stored thereon program code executable by the controller 56, and one or more power amplifiers 59; and a battery stack 60. The downhole processor 56 can be any suitable processor known in the art for EM tools, and can be for example, a dsPIC33 series MPU. The power amplifiers 59 can be a power MOSFET H-bridge design configured to transmit data.

The D&I sensor module 50 comprises three axis accelerometers, three axis magnetometers and associated data acquisition and processing circuitry. Such D&I sensor modules are well known in the art and thus are not described in detail here.

The electronics subassembly 36 includes sensors mounted and circuitry for taking various measurements of borehole parameters and conditions including gamma, temperature, pressure, shock, vibration, RPM, and directional parameters. Such sensor circuitry are also well known in the art and thus are not described in detail here.

The main circuit board 54 can be a printed circuit board with electronic components soldered on the surface of the board 54. The main circuit board 54 and the sensor modules 50, 52 are secured on a carrier device (not shown) which is fixed inside the electronics subassembly housing by end cap structures (not shown). The sensor modules 50, 52 are each electrically communicative with the main circuit board 54 and send measurement data to the downhole processor 56.

Figure 4:
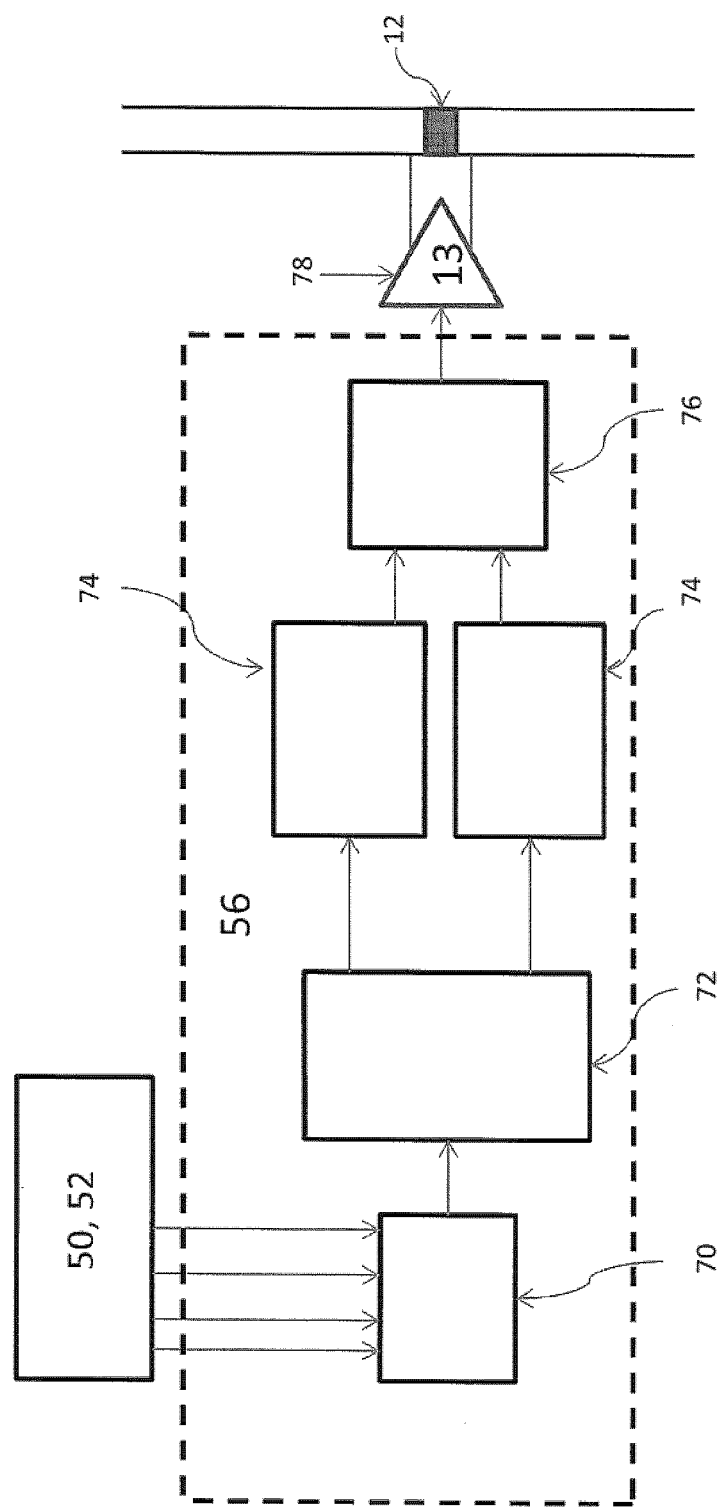
FIG. 4 is a flow chart of steps performed by the downhole EM telemetry tool in a method for transmitting a multi-channel EM telemetry signal with a combined waveform that is a combination of two or more separate waveforms each representing a separate telemetry channel.

As will be described below, the memory 58 contains encoder program code that can be executed by the downhole processor 56 to perform a method of encoding and transmitting a multi-channel EM telemetry signal using a combined waveform that is a combination of two or more separate waveforms each representing a separate telemetry channel. Referring to FIG. 4, the downhole processor 56 reads raw measurement data from the sensor modules 50, 52 and encodes this raw data into an encoded digital bitstream (block 70). Then the downhole processor 56 separates the encoded digital bitstream into two or more separate digital bitstreams, which in the embodiment shown in FIG. 4 comprises a first bitstream and a second bitstream (block 72). Then, the downhole processor 56 converts each digital bitstream into a separate waveform, namely a first waveform and a second waveform (otherwise referred to as "first telemetry channel" and "second telemetry channel"); this conversion involves using a selected digital modulation technique to modulate the waveforms, wherein the frequency of each waveform being modulated is assigned a unique value or a unique, non-overlapping range of values, i.e. a value or range of values that is different than the value or range of values of the corresponding parameter(s) of the other waveforms (block 74). Then the downhole processor 56 combines each separate waveform into a combined waveform (block 76), and then sends a control signal to the signal generator 13 to transmit an EM telemetry signal comprising the combined waveform (otherwise referred to as "carrier wave") across the gap sub 12 (block 78).

Alternatively, the conversion of each digital bitstream into a separate waveform can use a selected digital modulation technique to modulate the waveforms wherein the phase of each waveform being modulated is assigned a unique value or a unique non-overlapping range of values. In yet another alternative, the conversion step can involve assigning a unique frequency and a unique phase (or unique non-overlapping ranges of such frequencies and phases) to each waveform.

Various digital modulation techniques known in the art can be used to encode each separate waveform, such as ASK, PSK, FSK, BPSK, QPSK or any combination of these or other individual modulation techniques as is known in the art. As one (or more) of the amplitude, frequency and phase of the separate waveforms is set at a unique value, the plurality of separate waveforms encoded by one or more of these techniques can be superimposed to form one combined waveform (carrier wave) for transmission to surface. As a result, one EM signal comprising the carrier wave composed of two or more telemetry channels can be transmitted to surface.

Figure 8:
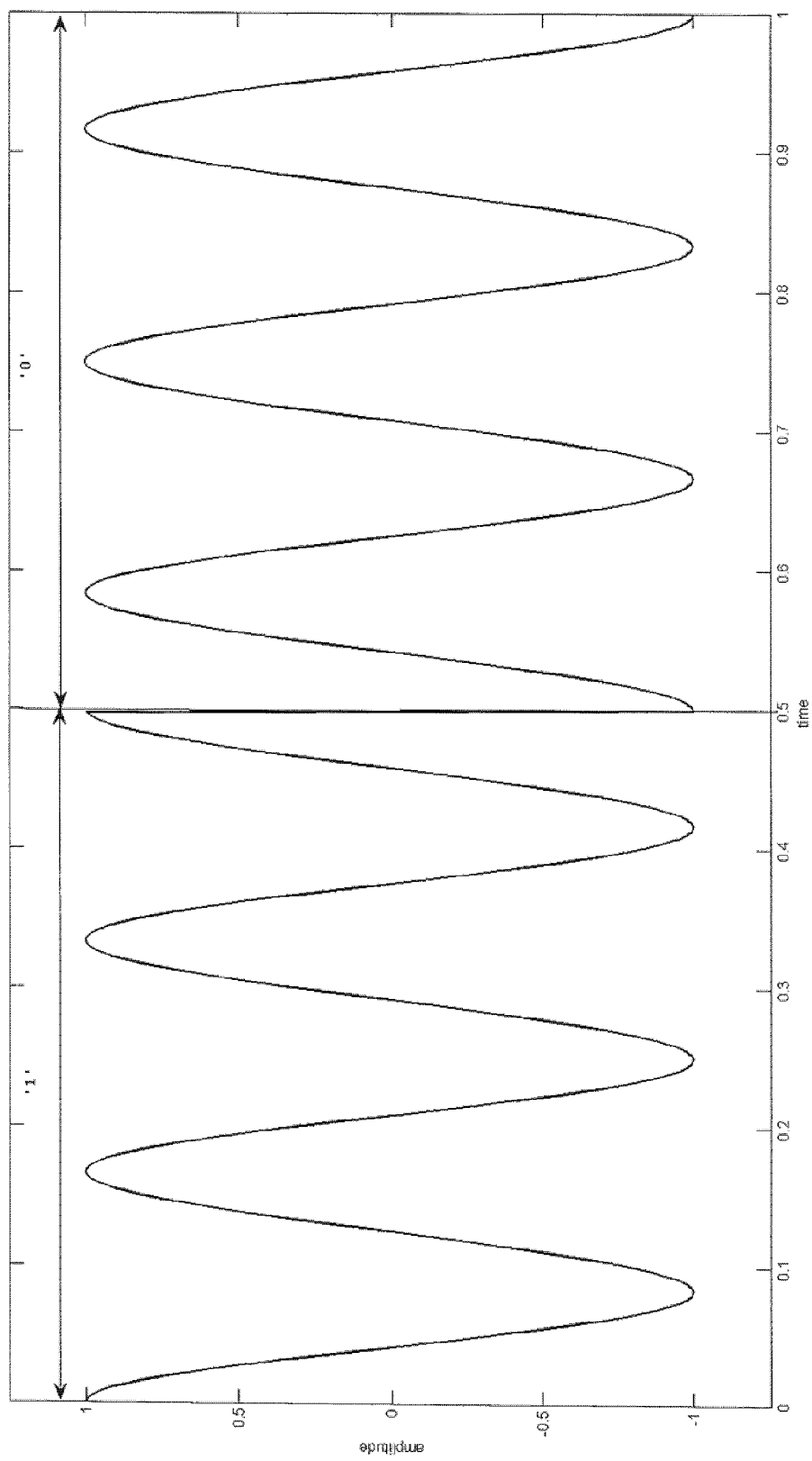
FIG. 8 is a graph of a first downhole waveform of a first telemetry signal.
Figure 9:
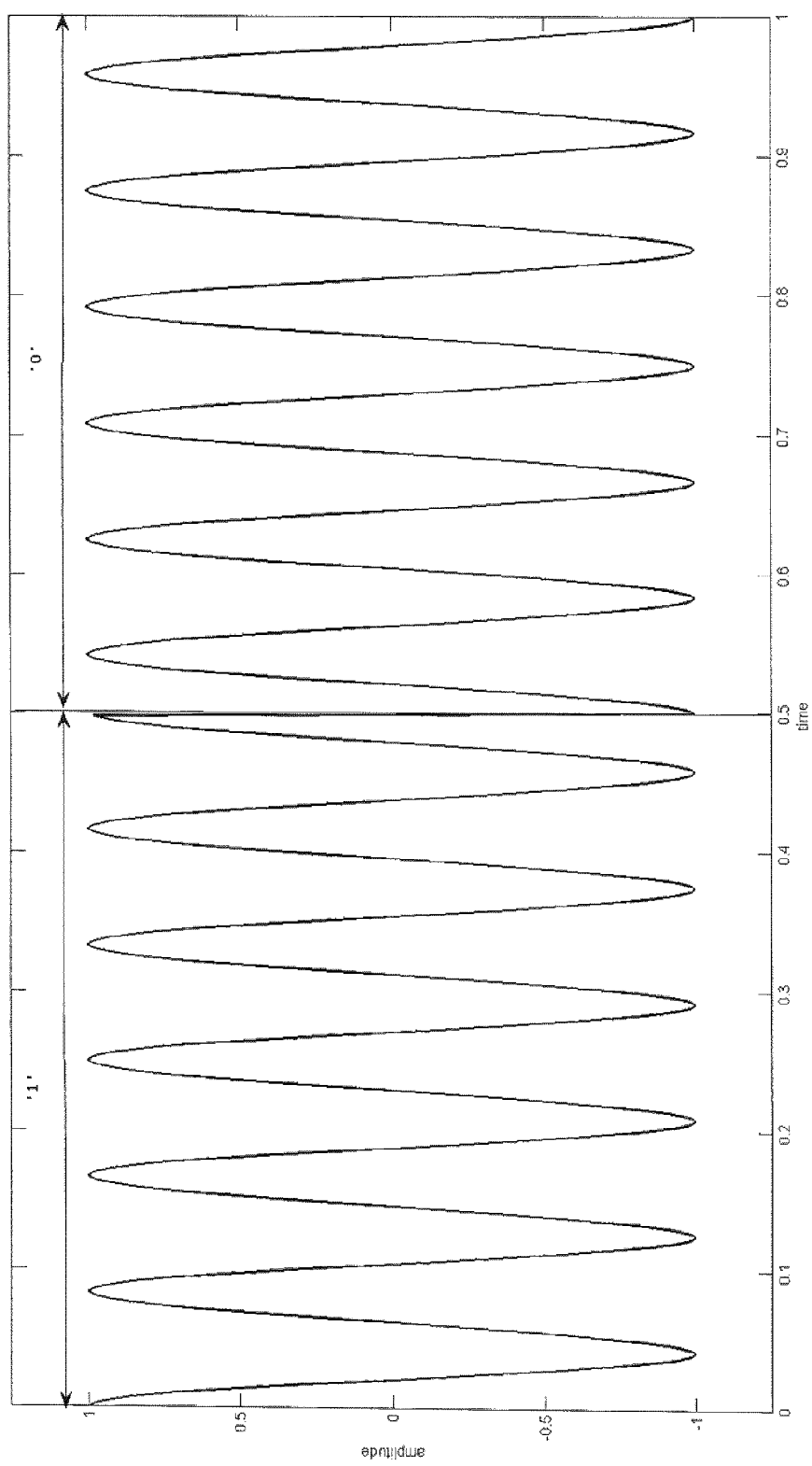
FIG. 9 is a graph of a second downhole waveform of a second telemetry signal.
Figure 10:
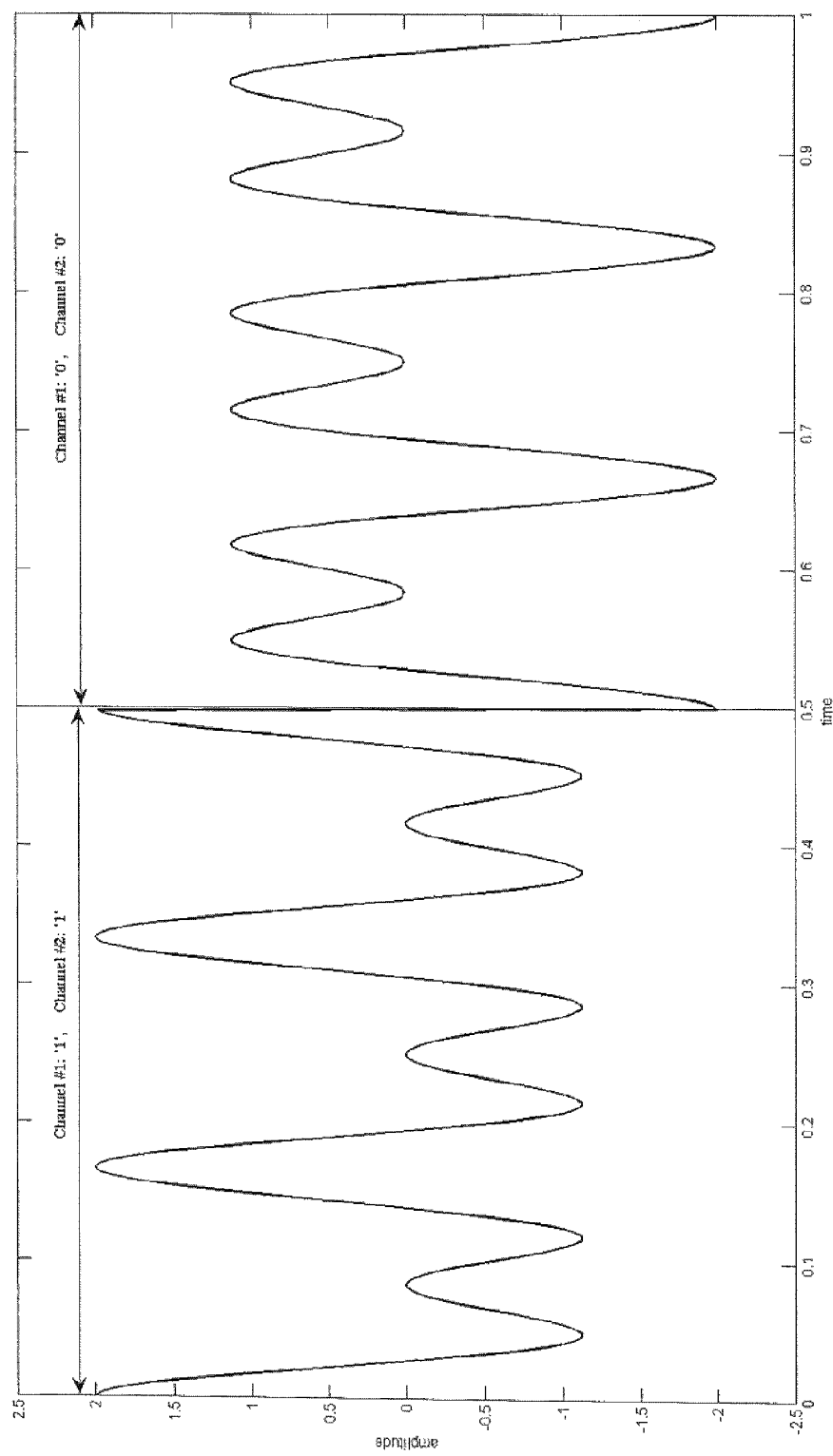
FIG. 10 is a graph of a multi-channel EM telemetry signal that is the combination of the first and second downhole waveforms, as transmitted by the downhole EM telemetry tool.

In one example and referring to FIGS. 8 to 10, each separate waveform can be modulated using BPSK with different frequencies then combined into the combined waveform. FIG. 8 shows a first downhole waveform for the first channel, having a maximum amplitude of 1.0, a frequency of 6 Hz, and a phase shift of 180 degrees at time 0.5. FIG. 9 shows a second downhole waveform for the second channel, having a maximum amplitude of 1.0, a frequency of 12 Hz, and a phase shift of 180 degrees at time 0.5. FIG. 10 shows a combined downhole waveform representing the combination of the first and second downhole waveforms.

In another example (not shown), each separate waveform can be modulated using ASK with different frequencies. In this modulation technique, the power amplifiers 59 can be used to modulate the amplitudes of each waveform instead of or in addition to the processor 56 performing a digital ASK modulation.

Figure 5:
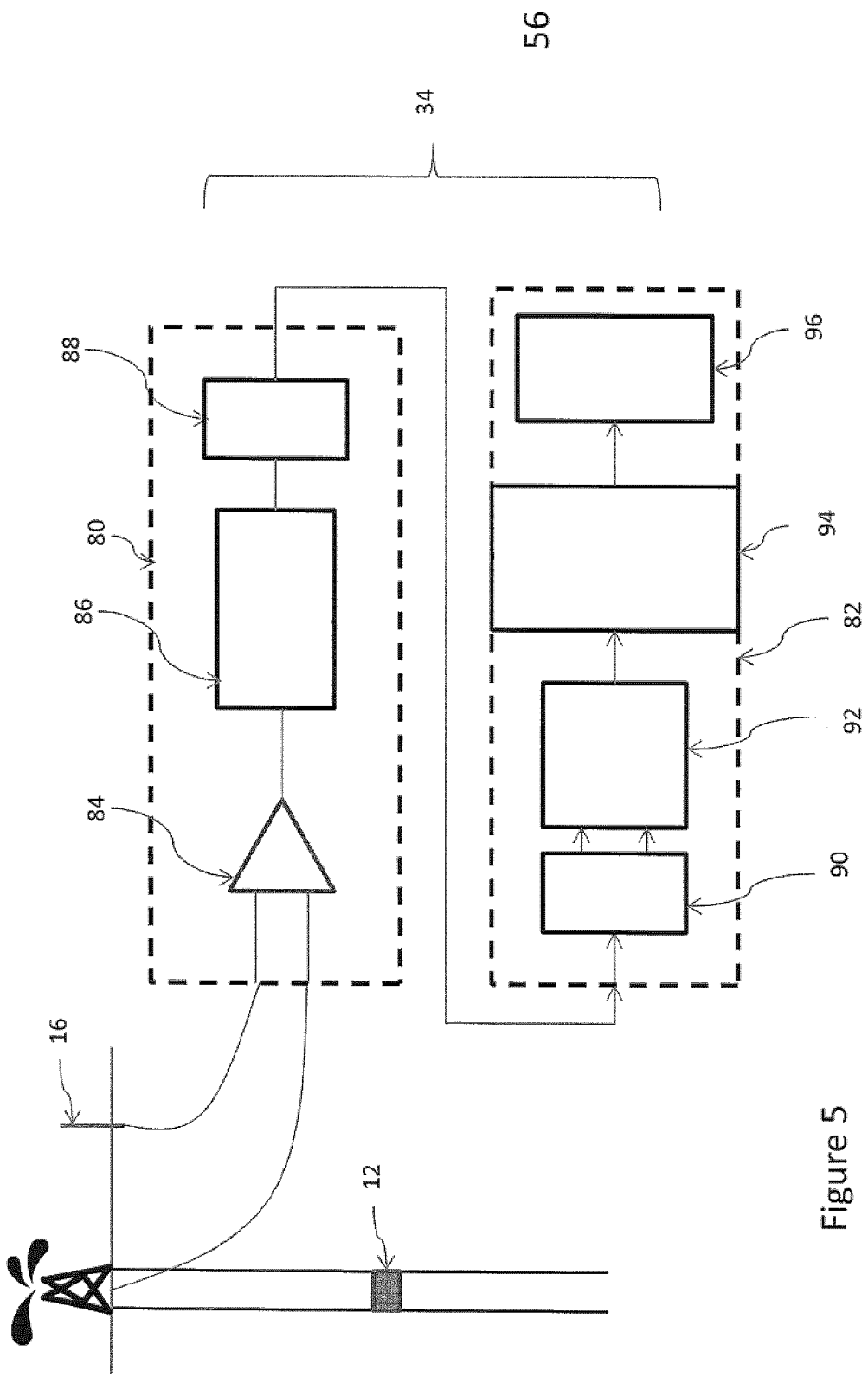
FIG. 5 is a schematic block diagram of surface components of the multi-channel EM telemetry system according to one embodiment.
Figure 11:
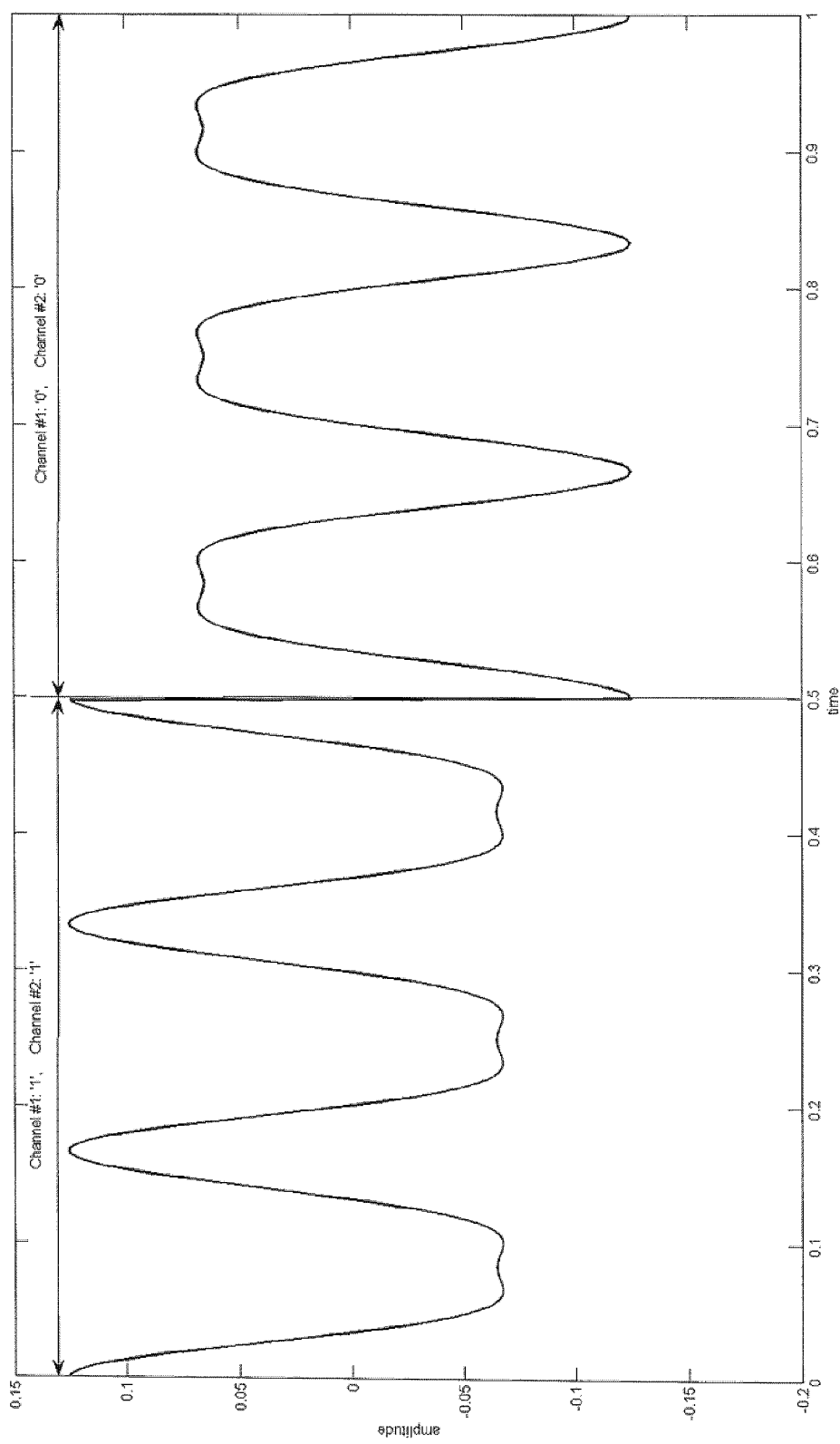
FIG. 11 is a graph of the multi-channel EM telemetry signal as received by the surface components.

Referring now to FIG. 5, the surface receiving and processing equipment 34 receives the carrier wave and decodes the combined waveform to recover each separate telemetry channel; the carrier wave sent by the EM telemetry tool 32 shown in FIG. 10 will have attenuated as the carrier wave travels through the Earth and FIG. 11 shows the carrier wave as received by surface receiving and processing equipment 34. The telemetry channels can then be converted back into the measurement data for use by the operator. As will be described in detail below, the surface receiving and processing equipment 34 will have stored thereon a demodulation technique corresponding to the selected modulation technique used by the EM telemetry tool 32 and the unique phase or frequency value of each separate waveform of the carrier wave used by the downhole EM telemetry tool 32 to encode the separate waveforms, so that the carrier wave can be decoded to obtain the telemetry data.

The surface receiving and processing equipment 34 comprises a surface receiver 80 and a decoder 82. The surface receiver 80 is located in the receiver box 18 and comprises a preamplifier 84 electrically coupled to the communication cables to receive and amplify the EM telemetry transmission comprising the carrier wave, a band pass filter 86 communicative with the preamplifier 84 configured to filter out unwanted noise in the transmission, and an analog to digital converter (ADC) 88 communicative with the band pass filter 86 to convert the analog carrier wave into a digital signal. Such preamplifiers, band pass filters, and ND converters are well known in the art and thus are not described in detail here. For example, the preamplifier can be a INA118 model from Texas Instruments, the ADC can be a ADS1282 model from Texas Instruments, and the band pass filter can be an optical band pass filter or an RLC circuit configured to pass frequencies between 0.1 Hz to 20 Hz.

The decoder 82 is, in one embodiment, a general purpose computer comprising a central processing unit (CPU and herein referred to as "surface processor") and a memory having decoder program code executable by the surface processor to perform various decoding functions, including digital signal filtering and separation, digital signal processing, digital signal recombination, and digital signal-to-telemetry data decoding. Instead of using the surface processor to perform all of the decoding functions, separate hardware components can be used to perform one or more of the decoding functions; for example, an application-specific integrated circuit (ASIC) or field-programmable gate arrays (FPGA) can be used to perform the digital signal processing in a manner as is known in the art.

Figure 7:
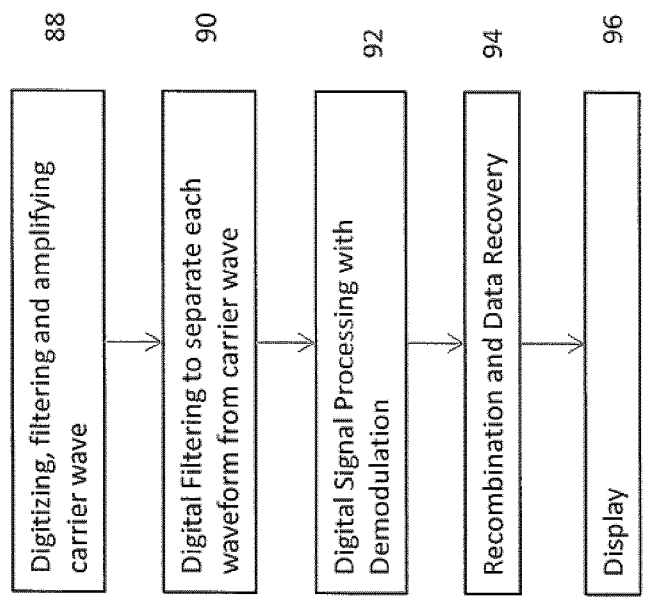
FIG. 7 is a flow chart of steps performed by the surface components of the multi-channel EM telemetry system to receive and decode the multi-channel EM telemetry signal transmitted by the downhole EM telemetry tool.

Referring to FIG. 7, the decoder 82 receives the carrier wave that has been digitized, filtered and amplified by the surface receiver 80, and performs each of the following decoding functions in the following sequence (these decoding functions are stored as program code on the memory of the computer and are executable by the surface processor):

Digital Filtering (step 90): When each of the different waveforms is encoded by a modulation technique at a unique frequency, the program code comprises a series of band pass filters that are used to separate different bands (frequency signals) from the carrier wave. More particularly, each band pass filter is configured to pass one of the unique frequency bands corresponding to one of the separate waveforms and severely attenuate all other frequencies, such that the waveform corresponding to this unique frequency band can be separated from the carrier wave.

Figure 12:
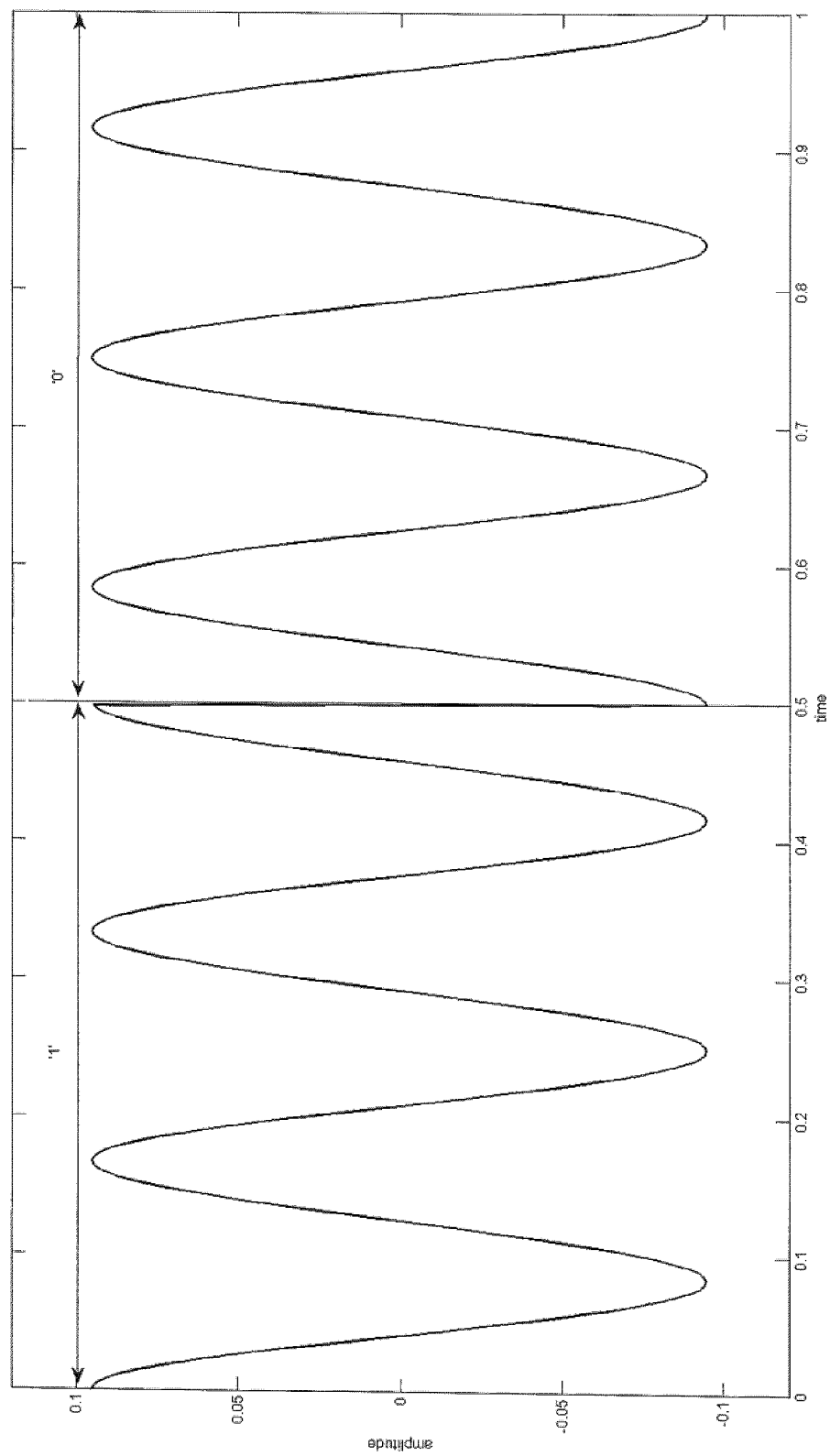
FIG. 12 is a graph of first telemetry signal separated from the EM telemetry signal by the surface components.
Figure 13:
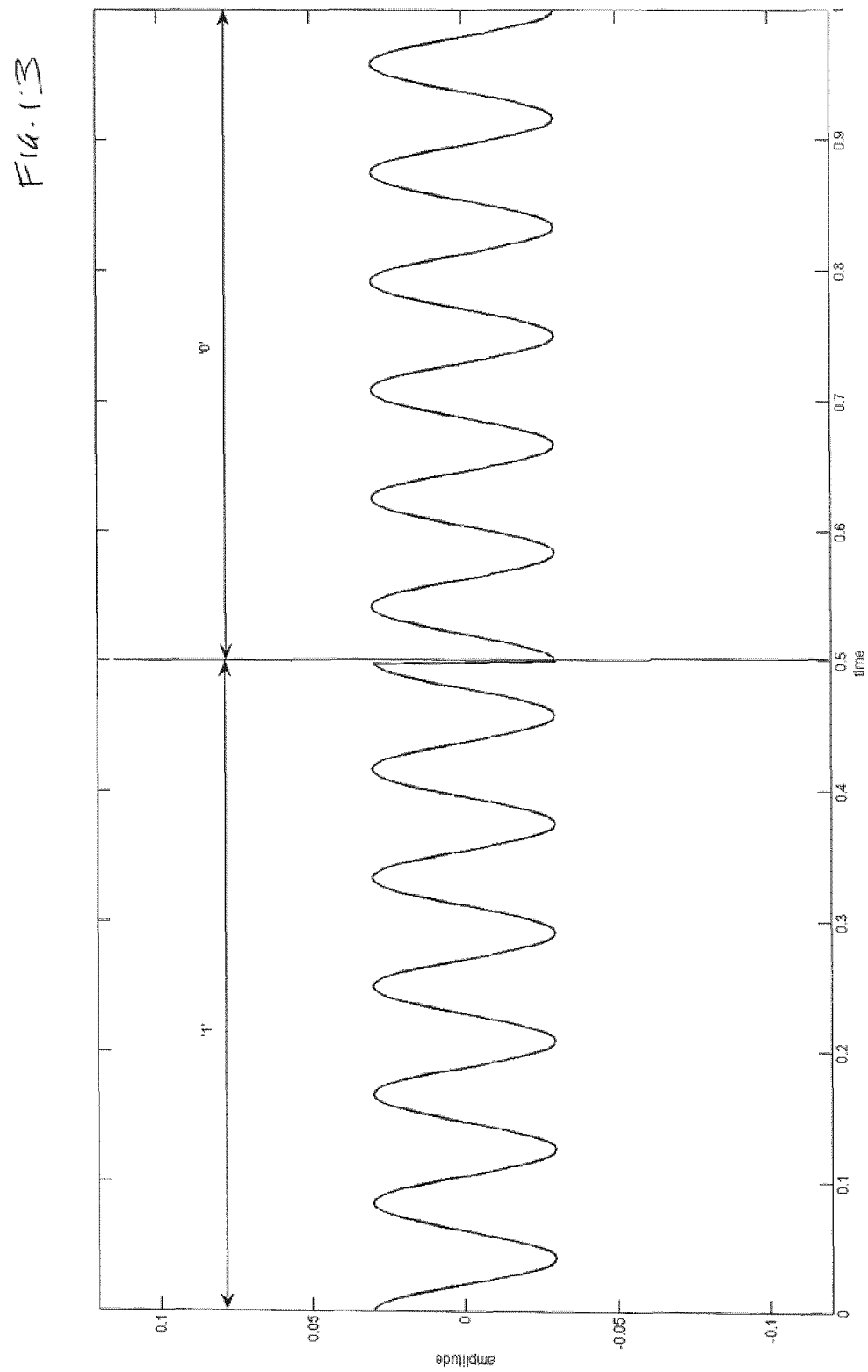
FIG. 13 is a graph of second telemetry signal separated from the EM telemetry signal by the surface components.

Digital Signal Processing (Step 92): Each separated waveform is in a bitstream form and is then subjected to a series of digital processing treatments known in the art, such as automatic gain control (AGC) to normalize the signal amplitude, synchronization to find the phase and timing differences between incoming signals and local oscillation signals, and demodulation and decoding to recover binary bits. Such digital processing treatments are known in the art of digital signal processing and thus are not described in detail here. Then, each separate waveform is demodulated back into the corresponding measurement data bitstream using a demodulation technique that is configured to correspond specifically to the modulation technique used to encode the separate measurement data bitstreams into the separate waveforms. Using the example shown in FIGS. 8 to 10 but now referring to FIGS. 12 to 13, the demodulation technique will determine the phase of each separate waveform, and map the waveform back to the symbol it represents, thus recovering the original data bitstream (FIG. 12 shows the first waveform and FIG. 13 shows the second waveform). Such demodulation techniques are well known in the art and thus are not described in detail here.

Digital Signal Recombination (Step 94): After demodulation, the separate raw measurement data streams are recombined back into the single raw measurement data stream that existed at step 70. Once the single raw measurement data bitstream has been recombined, the data can be decoded and viewed on the computer display 20 or manipulated by the operator into a useful form for display (step 96).

Instead of recombining all of the separate measurement data streams into the single measurement data stream, a subset of separate data stream can be combined for display to the operator, or each individual data stream can be processed and displayed for the operator.

Figure 6:
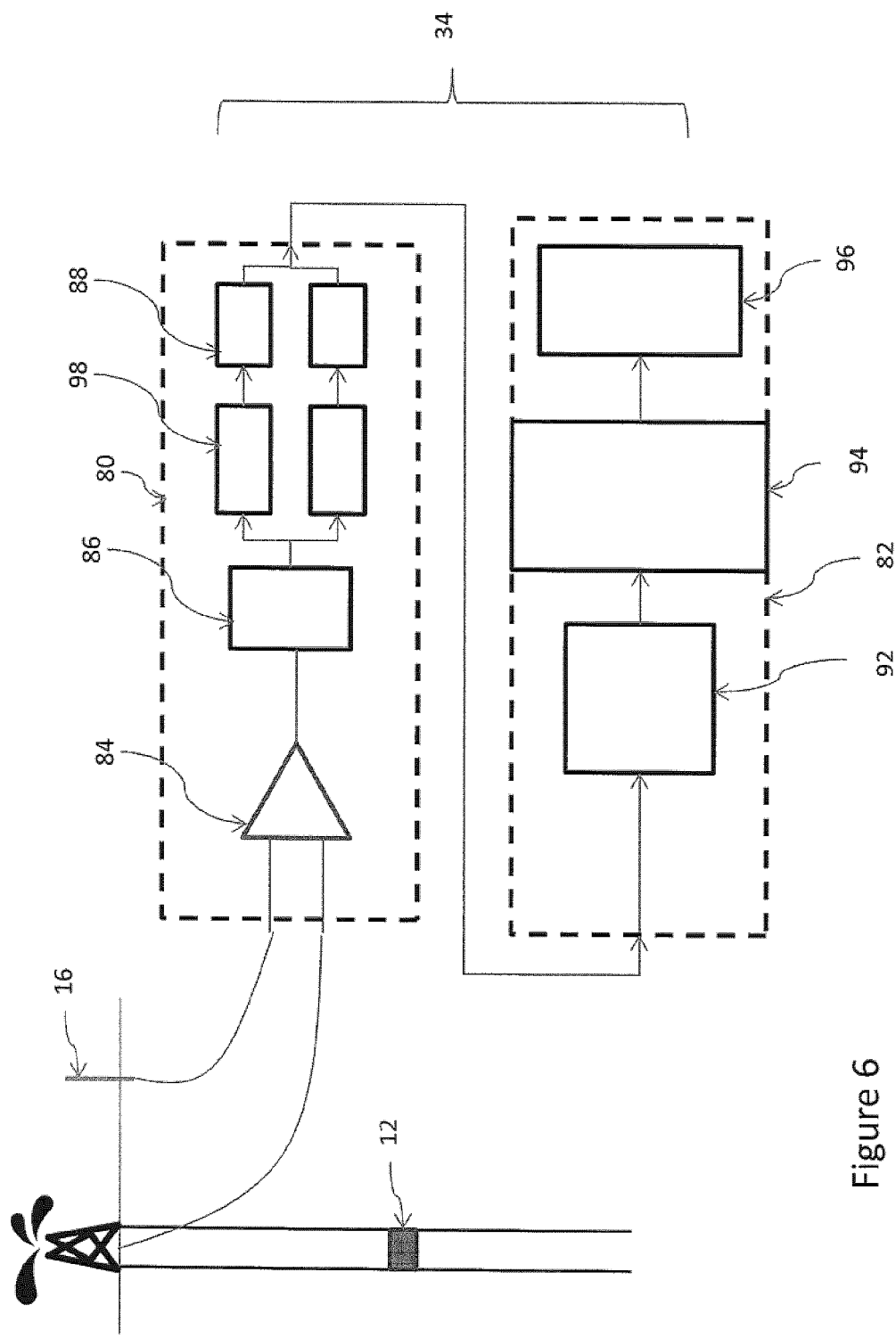
FIG. 6 is a schematic block diagram of surface components of the multi-channel EM telemetry system according to another embodiment.

According to an alternative embodiment and referring to FIG. 6, the surface receiver 80 and decoder 82 have been modified such that all signal filtering is performed by the surface receiver 80 on the analog waveforms, prior to digitization. More particularly, the surface receiver 80 employs narrow band hardware filters 98 of different frequency ranges to separate out each separate analog waveform from the analog carrier wave. Multiple ADCs are then used to convert the multiple analog waveforms into digital signals. In contrast, the surface receiver 80 and decoder 82 according to FIG. 5 performs analog signal filtering of the analog carrier wave, as well as digital signal filtering of the digitized carrier wave. Here, only one ADC is used to convert the carrier wave into digital form, and digital bandpass filtering is performed by software rather than by hardware.

Figure 14:
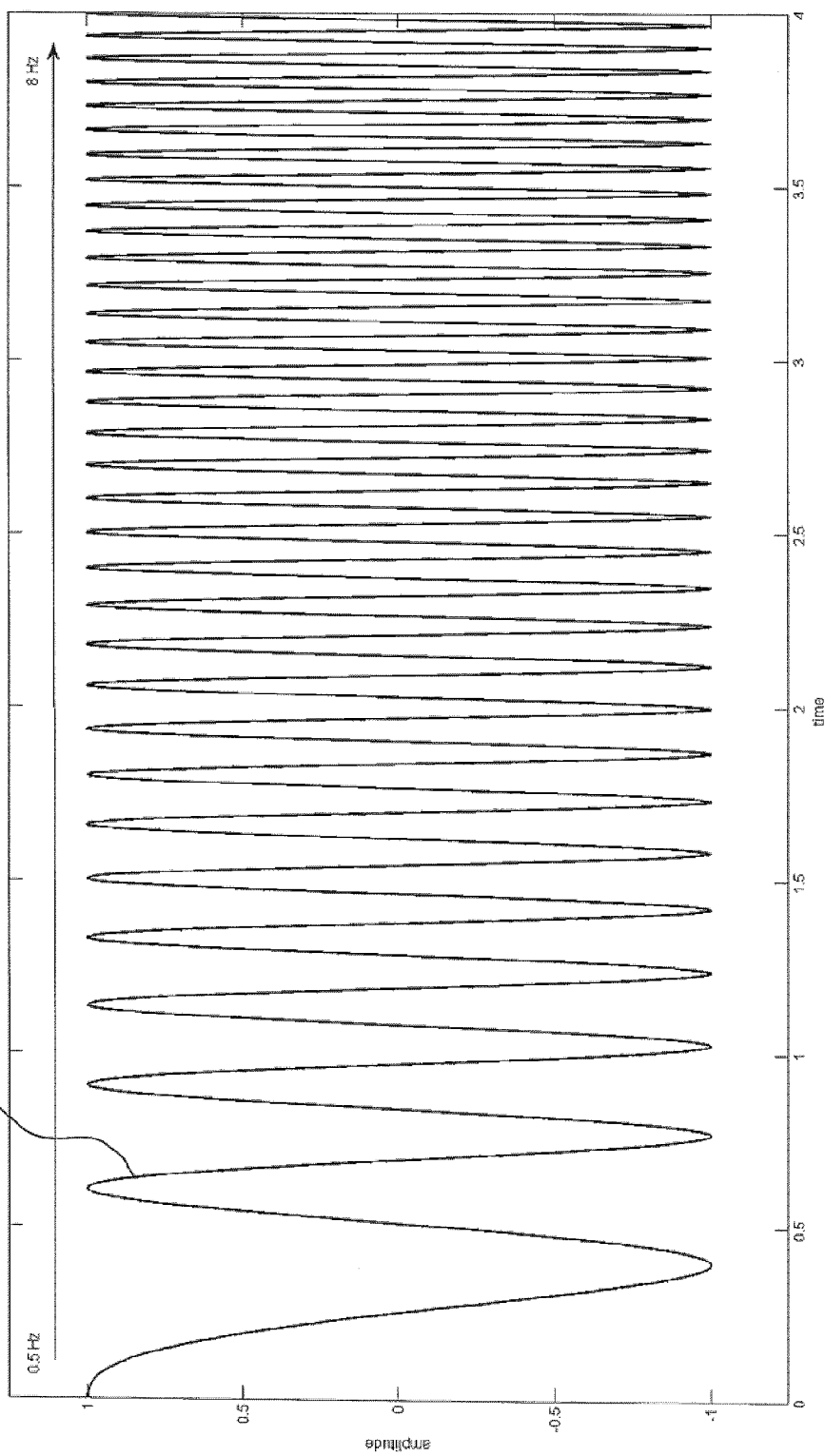
FIG. 14 is a graph of a downhole reference frequency sweep waveform having a continuously increasing frequency according to one embodiment.
Figure 15:
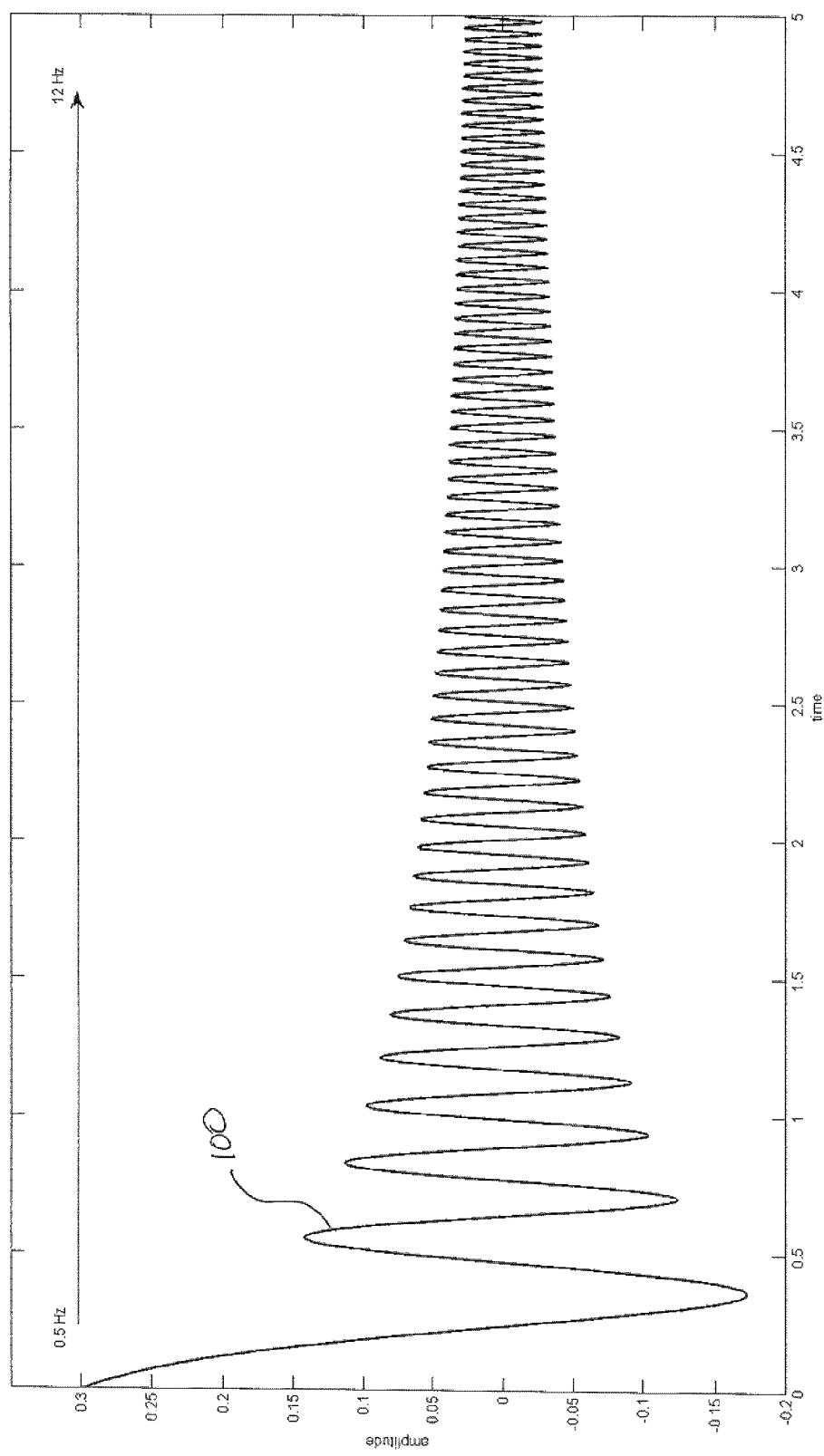
FIG. 15 is a graph of the downhole reference frequency sweep waveform of FIG. 14 as received by a surface receiver.
Figure 16:
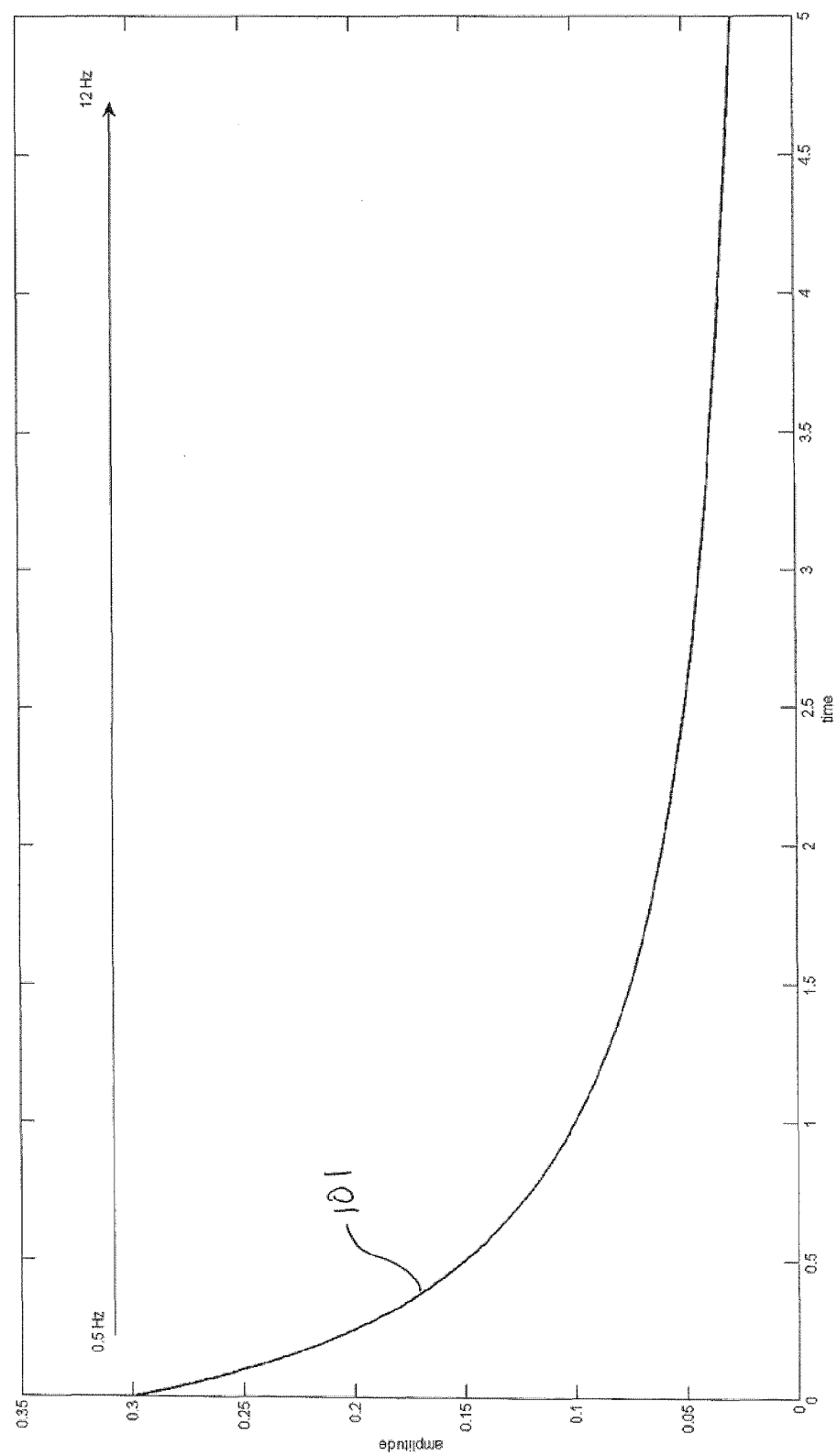
FIG. 16 is a graph plotting the amplitude against frequency range of the received downhole frequency sweep waveform of FIG. 15.

Optionally, the decoder 82 can also execute an algorithm which compensates for attenuation caused by the low pass filter characteristics of the Earth and other conditions of the drill site. This attenuation compensation algorithm can be constructed in accordance with one of the methods illustrated in FIGS. 14 to 19. In a first method shown in FIGS. 14 to 16, a frequency sweep waveform 99 having a consistent reference amplitude and a continuously increasing frequency over a determined time period can be transmitted by the EM telemetry tool 32 during an idle time in the drilling so that the drilling process is not interrupted. As can be seen in FIG. 14, the reference amplitude is set to match the amplitude of each separate waveform used by the EM telemetry tool 32 to produce the combined waveform, and the frequency can be set to increase at a selected rate. As can be seen in FIG. 15, the frequency sweep waveform received at surface 100 will attenuate after having traveled through the Earth to the surface receiver 80. The attenuation rate will tend to increase with increasing frequency, wherein the value of the attenuation rate will vary with the physical properties and operating conditions of the drill site. As can be seen in FIG. 16, the amplitude of the received frequency sweep waveform can be plotted over the frequency range to produce an attenuation curve 101. This attenuation curve 101 is stored on the DSP 92 and is applied to the received waveforms to compensate for the attenuation caused by the Earth.

Figure 17:
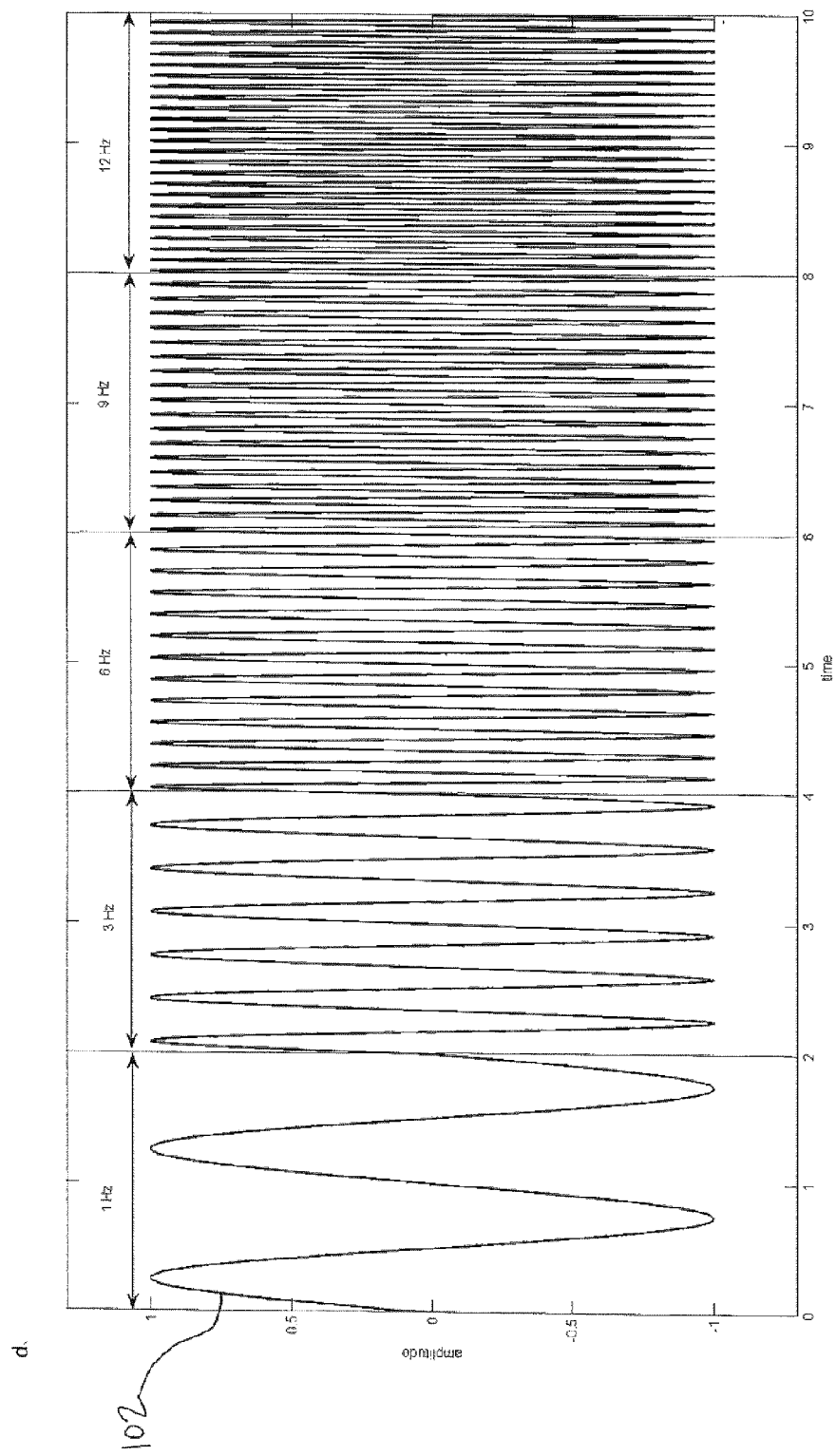
FIG. 17 is a graph of a downhole reference frequency sweep waveform having discreet frequency steps according to another embodiment.
Figure 18:
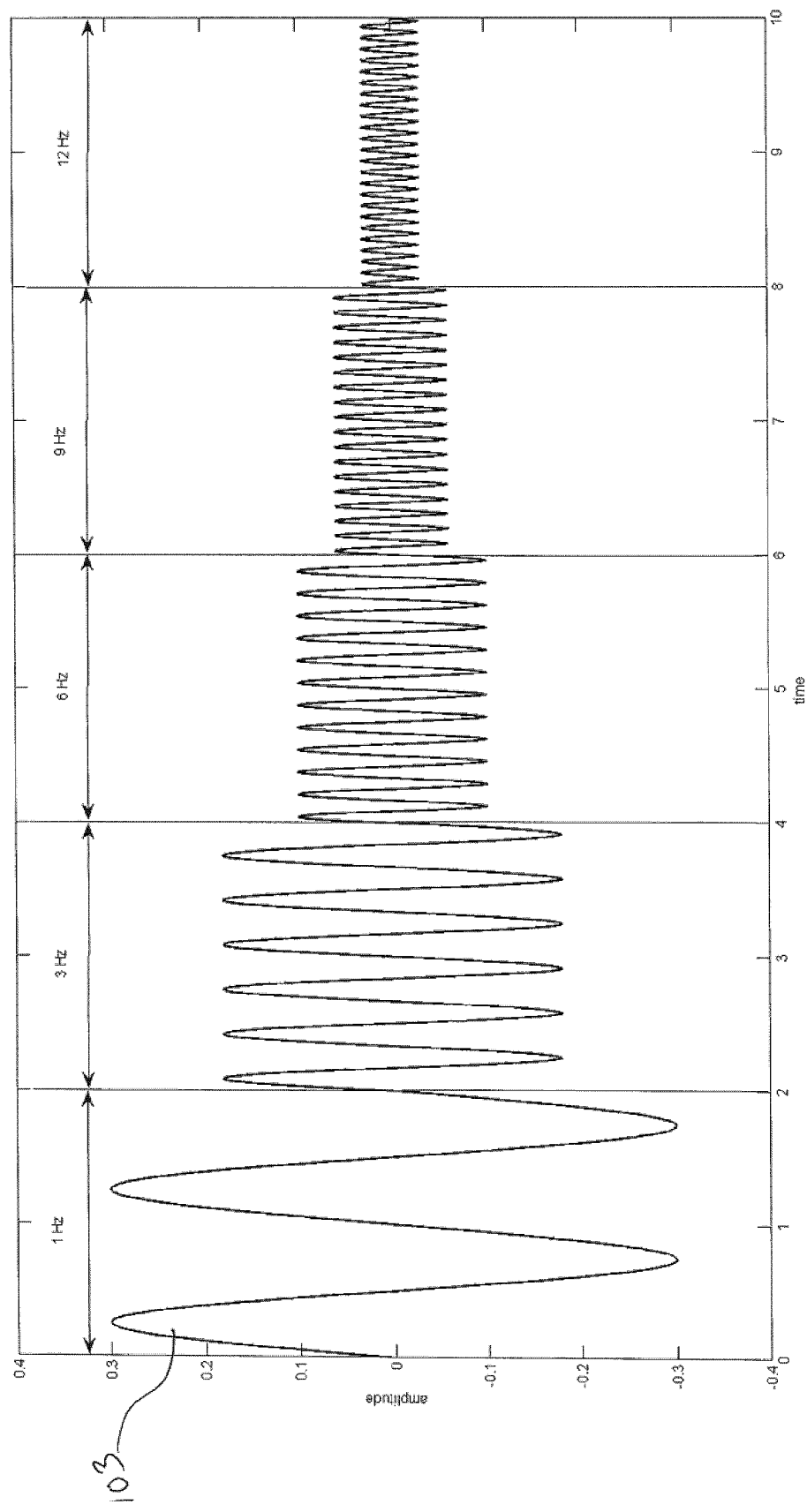
FIG. 18 is a graph of the downhole reference frequency sweep waveform of FIG. 17 as received by a surface receiver.
Figure 19:
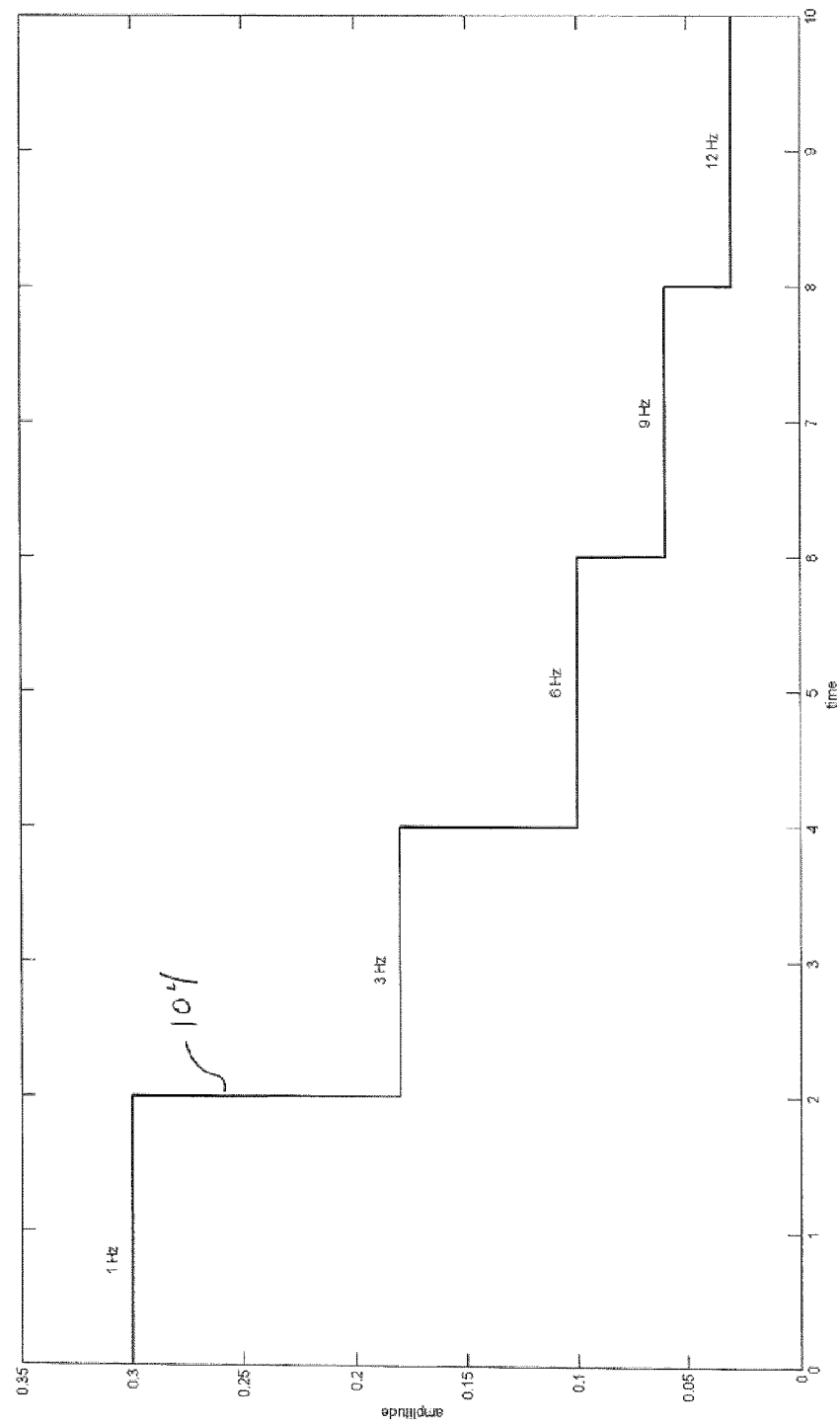
FIG. 19 is a graph plotting the amplitude against frequency range of the received downhole frequency sweep waveform of FIG. 18.

According to another embodiment, another frequency sweep waveform 102 and an attenuation curve 104 produced from this frequency sweep waveform is shown in FIGS. 17 to 19. In this frequency sweep waveform 102, the frequency is held constant for a short period of time, then changed in discrete steps. FIG. 17 shows this frequency sweep waveform as transmitted by the EM telemetry tool 32, and FIG. 18 shows an attenuated frequency sweep waveform 103 as received by the surface receiver which has been attenuated travelling through the Earth. FIG. 19 shows a stepped attenuation curve over frequency. For the frequencies of the first and second downhole waveforms shown in FIGS. 8 and 9 (6 and 12 Hz), the expected surface amplitude levels would approximately 0.1 and 0.03 based on downhole amplitudes of 1.0.

While the present invention is illustrated by description of several embodiments and while the illustrative embodiments are described in detail, it is not the intention of the applicants to restrict or in any way limit the scope of the appended claims to such detail.

Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of the general concept.

What is claimed is:

1. An electromagnetic (EM) telemetry method in a downhole drilling operation, comprising
    (a) encoding downhole data into a single data stream;
    (b) separating the single data stream into a plurality of separate data streams;
    (c) converting each separate data stream into a corresponding separate waveform using a selected digital modulation technique wherein the frequency of each waveform is assigned a unique value or unique non-overlapping range of values;
    (d) combining each separate waveform into a combined waveform;
    (e) transmitting from a downhole telemetry tool in a downhole location, an electromagnetic (EM)
    telemetry carrier wave comprising the combined waveform and a separate selected frequency sweep waveform; and
    (f) receiving at a surface location, the carrier wave and the frequency sweep waveform, plotting at the surface location the attenuation of the frequency sweep waveform over a frequency range comprising the carrier wave to produce an attenuation compensation curve, and applying at the surface location the attenuation compensation curve to the carrier wave that has been attenuated by passage through earth.

2. A method as claimed in claim 1 wherein the selected digital modulation technique is selected from the group consisting of: amplitude shift keying (ASK), phase shift keying (PSK), and frequency shift keying (FSK).

3. A method as claimed in claim 2 wherein the frequency of each waveform is assigned a unique value.

4. A method as claimed in claim 1 further comprising:
    (f) at the surface location, filtering each separate waveform from the received carrier wave using the assigned unique value of that separate waveform;
    (g) demodulating each separate waveform into the corresponding separate data stream; and (h) combining the separate data streams into the single data stream.

5. A method as claimed in claim 4 further comprising decoding the single data stream into the downhole data and displaying the downhole data.

6. A method as claimed in claim 4 further comprising amplifying the carrier wave.

7. A method as claimed in claim 6 further comprising applying a band-pass filter to the carrier wave to remove unwanted frequencies.

8. A method as claimed in claim 7 wherein the carrier wave is analog and the step of demodulating is applied to the analog carrier wave and the separate data streams are analog and are converted into digital data streams.

9. A method as claimed in claim 7 wherein the carrier wave is analog and the method further comprises converting the analog carrier wave into a digital signal.

10. A method as claimed in claim 1 wherein the frequency sweep waveform comprises a consistent reference amplitude corresponding with an amplitude of the separate waveforms.

11. A method as claimed in claim 10 wherein the frequency sweep waveform is transmitted during an idle time during a drilling operation.

12. A method as claimed in claim 11 wherein the frequency sweep waveform comprises a continuously increasing frequency over a selected time period.

13. A method as claimed in claim 11 wherein the frequency sweep waveform comprises discrete steps of increasing frequency over a selected time period.

14. An electromagnetic (EM) telemetry system for use in downhole drilling operation, comprising:
  a downhole telemetry tool comprising:
  (a) a gap sub assembly;
  (b) an EM carrier frequency signal generator for generating an EM carrier wave across an electrically isolated gap of the gap sub assembly;
  (c) an electronics subassembly communicative with the signal generator and comprising a downhole processor and a memory containing an encoder program code executable by the downhole processor to perform a method comprising:
    (i) encoding downhole data into a single data stream;
    (ii) separating the single data stream into a plurality of separate data streams;
    (iii) converting each separate data stream into a corresponding separate waveform using a selected digital modulation technique wherein the frequency of each waveform is assigned a unique value or unique non-overlapping range of values;
    (iv) combining each separate waveform into a combined waveform;
    (v) sending a first control signal to the signal generator to transmit an EM telemetry carrier wave comprising the combined waveform and sending a second control signal to the signal generator to transmit a selected frequency sweep waveform; and
  (d) a surface receiver configured to receive the carrier wave and the frequency sweep waveform, and comprising a surface processor and a memory containing program code executable by the surface processor to perform a method comprising: receiving at a surface location, the carrier wave and the frequency sweep waveform, plotting at the surface location the attenuation of the frequency sweep waveform over a frequency range comprising the carrier wave to produce an attenuation compensation curve, and applying at the surface location the attenuation compensation curve to the carrier wave that has been attenuated by passage through earth.

15. A system as claimed in claim 14 wherein the downhole telemetry tool further comprises a directional and inclination sensor module and a drilling conditions sensor module both communicative with the processor.

16. A system as claimed in claim 15 further comprising:
  a decoder communicative with the surface receiver and comprising the surface processor and wherein the memory includes a decoder program code executable by the surface processor to perform a method comprising:
  (i) filtering each separate waveform from the carrier wave using the assigned unique value of that separate waveform;
  (ii) demodulating each separate waveform into the corresponding separate data stream; and
  (iii) combining the separate data streams into the single data stream.

17. A system as claimed in claim 16 wherein the decoder program is further executable by the surface processor to decode the single data stream into the downhole data and transmit the downhole data to a display.

18. A system as claimed in claim 16 wherein the surface receiver further comprises an amplifier configured to amplify the received carrier wave.

19. A system as claimed in claim 18 wherein the surface receiver further comprises a band pass filter configured to filter out unwanted noise in the received carrier wave.

20. A system as claimed in claim 18 further comprising an analog-to-digital converter to convert the received carrier wave into a digital signal.

21. A system as claimed in claim 19 wherein the surface receiver further comprises a narrow band filter corresponding to each separate waveform and configured to separate the corresponding separate waveform from the carrier wave.

* * * * *